United States Patent [19]

Suga

[11] 4,382,226
[45] May 3, 1983

[54] ELECTROLYTIC CELL FOR ACTINOMETERS

[76] Inventor: Shigeru Suga, 5-20-2, Yoyogi Shibuya-ku, Tokyo, Japan, 160

[21] Appl. No.: 338,653

[22] Filed: Jan. 11, 1982

[51] Int. Cl.$^3$ ............................................ G01R 11/44
[52] U.S. Cl. ...................................... 324/94; 250/370; 250/372
[58] Field of Search ...................... 324/94; 204/195 H; 250/370, 372

[56] References Cited

U.S. PATENT DOCUMENTS

| | | | |
|---|---|---|---|
| 1,069,211 | 8/1913 | Weintraub | 324/94 |
| 1,156,826 | 10/1915 | Tuttle | 324/94 |
| 1,171,279 | 2/1916 | Tuttle | 324/94 |
| 1,174,715 | 3/1916 | Hatfield | 324/94 |
| 3,809,905 | 5/1974 | Suga | 250/370 |

Primary Examiner—G. L. Kaplan
Attorney, Agent, or Firm—Wenderoth, Lind & Ponack

[57] ABSTRACT

An electrolytic cell for an actinometer, constituted by a glass vessel having a glass filter extending across the central portion thereof and forming a separator wall dividing the vessel into two side by side chambers. A body of mercury is provided in the bottom of one chamber and a platinum wire extends into the body of mercury for forming an anode for the cell. A carbon plate is mounted in the other chamber spaced from the separator wall and has a hole extending thereinto from the top, and mercury substantially fills the hole, and a further platinum wire extends into this mercury for forming a cathode for the cell. A glass tube extends downwardly from the other chamber for collecting precipitated mercury therein during operation of the cell, and an electrolyte fills the tube and the chambers and extends to a level just above the upper end of the carbon plate.

3 Claims, 5 Drawing Figures

ELECTROLYTIC CELL FOR ACTINOMETERS

The present invention relates to an electrolytic cell for actinometers, which measure optical energy. The electrolytic cell according to the invention has a higher sensitivity than conventional electrolytic cells and can be integrated into a system for measuring the energy of light in a short period of time.

BACKGROUND OF THE INVENTION AND PRIOR ART

Conventional actinometers employed in testing apparatus for measuring light fastness or weather-resistance employ silicon photocells as the light-receiving portions, and a photocurrent corresponding to the magnitude of light energy impinging on the photocells is fed to the electrolytic cell which is used to determine the total energy by determining the amount of mercury precipitated on the cathode due to the electrolysis of mercury iodide in the electrolyte by the photocurrent.

FIG. 1 shows the construction of a conventional electrolytic cell in which a separator wall 3 constituted by a glass filter is positioned in the upper central portion of a glass vessel 1, mercury 4 is stored in the lower portion on one side of the wall 2, and a tube 5 stretches downward from the bottom of the other side and contains an electrolyte 6 and precipitated mercury 7. On the one side of the glass vessel 1, the electrolyte and mercury are in upper and lower layers and a platinum wire 8 extends into the lower mercury layer to form an anode. On the other side of the glass vessel 1 a platinum wire 9 extends into the electrolyte to form a cathode 10. The other ends of the platinum wires are connected to a light-receiving unit. Although the sensitivity is low, the above conventional actinometer can make satisfactory measurements if used over an extended period of time. For example, when the energy radiated from a carbon arc lamp, used as a light source for light-fastness and weather-resistance testers, is measured, the actinometer is mounted on a specimen rack of the tester and rotated around the light source. After the light has been received for one week, the precipitated mercury 7 will have a depth of about 7 mm. When the light is received for one month, the precipitated mercury 7 will have a depth of about 30 mm. Depending upon the depth, therefore, the total amount of energy received can be determined.

Up to now such an actinometer has been used as an indicating means for, when the intensity of the source of light as measured by the actinometer deviates from the specified energy values, indicating that the lamp which acts as the light source should be checked and adjusted so that the intensity of light falls within a specified range.

When the measurement is carried out with a conventional actinometer for only one day, however, the depth of the precipitated mercury is less than 1 mm, and it is very difficult to obtain accurate results from such a small depth of mercury.

At present, however, the need to increase the precision of measurements and to save power have created increasing demands for the development of electrolytic cells capable of performing a similar measurement in less than one day.

SUMMARY OF THE INVENTION

In order to eliminate the above-described drawback inherent in the conventional actinometers, the inventors of the present invention have conducted a study to develop a device which provides precise results from such measurements in a short period of time.

To increase the sensitivity of devices operating on the same principle as that of the conventional devices, it is possible to increase the number of silicon photocells or to use silicon photocells having a higher sensitivity, i.e. a large size, in order to increase the photocurrent and thus the amount of mercury precipitated. Experimentally, however, the upper limit of the current density through the conventional platinum electrode is 1.25 mA/31.4 mm$^2$ $\approx$ 0.4A/cm$^2$. If the current density becomes greater than this, the relation between the energy and the current becomes nonlinear. Therefore, to simply increase the photocurrent from the silicon photocells does not help to solve the problem unless the areas of the electrodes are increased. To do this, platinum plates may be used instead of platinum wires. Use of platinum plates, however, is not only expensive but involves a major problem. When mercury precipitates on the surface of the electrode, at first fine mercury particles adhere to the platinum wire in a manner as if the platinum wire were wet. These fine mercury particles then coagulate into small particles which only then fall and collect in the bottom of the glass tube. During the initial stage of electrolysis, therefore, no mercury collects in the mercury reservoir. Therefore, a measurement based on operation of the device conducted for only a brief period of time will have a considerable degree of error. The phenomenon of mercury adhesion becomes an even greater problem with an increase in the surface area of the platinum electrode. Accordingly, even if the problem of current density is solved by increasing the area of the electrodes, the precision during the initial period of electrolysis is further reduced.

It has now been discovered and experimentally confirmed that when a carbon electrode is used in place of the platinum electrode, fine mercury particles which precipitate do not coagulate into small particles, but rather fall immediately in the form of the precipitated fine particles.

Therefore, accordingly to the present invention, the phenomenon of mercury adhering to the surface of the electrode is prevented by using a carbon electrode, formed in the shape of a plate to increase the surface area so the current density varies in proportion to the quantity of light energy. Further, the carbon electrode and the platinum wire acting as a contact therefor are connected together through mercury so as to eliminate defects stemming from a mechanical connection between the platinum wire and carbon, and the carbon electrode is enclosed in the glass cell and held by a portion of the platinum wire in order to overcome the difficulty of directly enclosing the carbon in the glass.

DESCRIPTION OF THE PREFERRED EMBODIMENT

Figure 1:
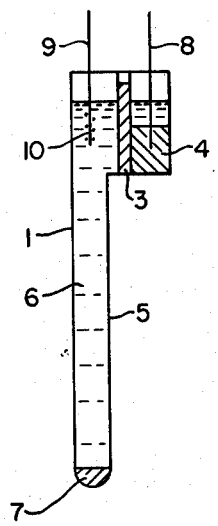
FIG. 1 is a diagram illustrating a conventional electrolytic cell.
Figure 2:
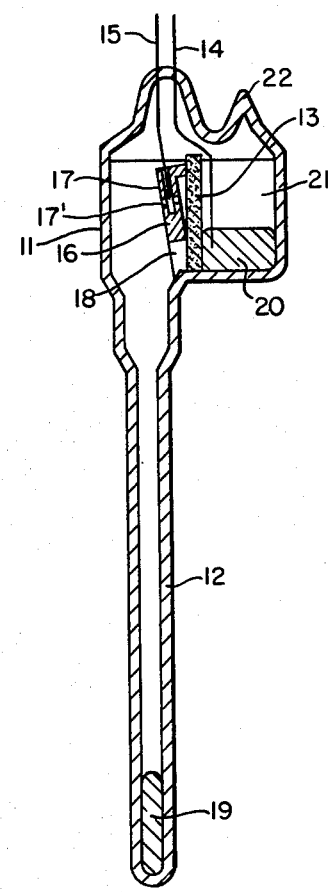
FIG. 2 is a sectional elevation view of an electrolytic cell according to the present invention.
Figure 3:
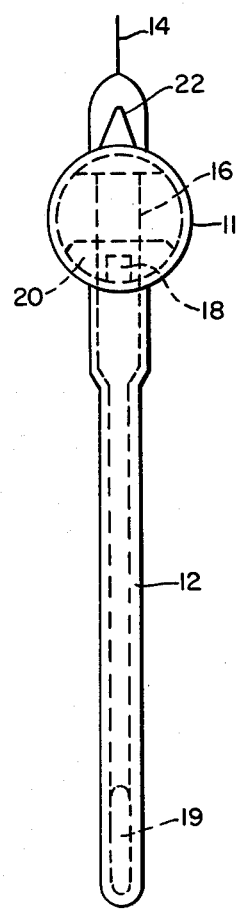
FIG. 3 is a side view of the electrolytic cell according to the present invention.
Figure 4:
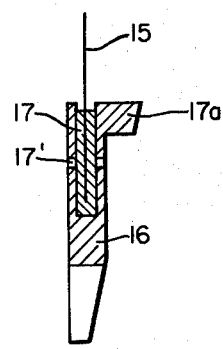
FIG. 4 is a sectional view of the carbon cathode of the cell according to the present invention.
Figure 5:
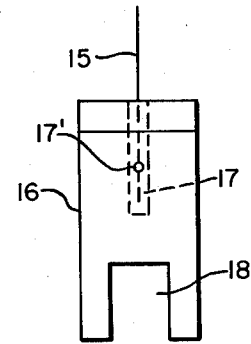
FIG. 5 is a side view of the carbon cathode as viewed from the separator wall.

As seen in FIGS. 2 and 3, a glass cell 11 is divided into two chambers by a separator wall 13 made of a glass filter, and a glass tube (inner diameter 2 mm) 12 extends downwardly from the bottom of one chamber of the glass cell 11 and the lower end of the glass tube 12 is closed. Except for the top, the separator wall is fused to the walls of the cell. The upper and lower ends of a carbon electrode 16 are fastened to the separator wall with an adhesive. One end of a platinum wire 15 is inserted into a vertical hole 17 formed in the carbon electrode 16 and filled with mercury. The platinum wire 15 is thus electrically connected to the carbon electrode 16 through the mercury. The other end of the platinum wire is sealed into the top of the cell 11 and is connected to an external light-receiving unit. As shown in FIG. 4, a small through hole 17' extends through the carbon electrode and hole 17 at right angles to the hole 17, the narrow through hole 17' having a diameter sufficient for permitting electrolyte 21 to flow therethrough but which does not permit mercury to flow therethrough. As shown in FIG. 5, the carbon electrode is in the shape of a flat plate with a lateral projection 17a at the upper end and a cut-away portion 18 at the lower end. The end projection 17a engages and is attached to separator wall 13 so as to space the side of the electrode which faces the separator wall from the separator wall. Mercury precipitated on the side of the electrode toward the separator wall 13 falls and passes through the cut-away portion 18 and builds up in a mercury reservoir 19 at the bottom of the tube 12. As seen in FIG. 2, mercury 20 is present in the chamber on the right side of cell 11, and cannot flow into the chamber on the left side through the separator wall. One end of the platinum wire 14 is immersed in mercury 20 to form an anode, and the other end is sealed into the top of the cell 11 and is further connected to the light-receiving unit. The level of the electrolyte 21 is slightly lower than the upper end of the separator wall 13 but nearly at a level with the upper end of the carbon cathode 16. The electrolyte and mercury are poured through the top 22 of the cell when it is manufactured and a port in the top is closed after they have been poured. The platinum wire is connected to the carbon electrode via mercury because if the platinum wire were simply mechanically attached to the carbon electrode, the contact resistance between the platinum wire and the carbon in the electrolyte will change over time as occurs in conventional electrodes.

The operation of the electrolytic cell according to the present invention will now be described. The electrolyte 21 consists of, for example, 34.1 g of mercuric iodide, 12.5 g of potassium iodide and 100 cc of distilled water. The depth of mercury in the mercury reservoir 19 should be measured prior to starting the operation. When the mercury is too high, or when it is desired to start the measurement from zero depth, the electrolytic cell should be turned upside down so that the mercury is all collected in the right hand chamber at the position of mercury 20. The electrolysis is initiated when a photocurrent from the light-receiving unit flows through the electrodes in the electrolytic cell. In the anode, the mercury is converted into mercury ions that dissolve in the electrolyte. In the cathode, mercury ions are converted into metallic mercury which precipitates on the surface of the carbon electrode, falls in the form of fine particles, and builds up in the mercury reservoir 19. Mercury precipitated on the surface of the carbon electrode on the side of the electrode facing toward the separator wall falls along the tilted surface and into the mercury reservoir through the cut-away portion 18 in the lower end of the carbon electrode. It is known that the amount of mercury which precipitates is proportional to the amount of photocurrent, so the cumulative amount of light (w/cm$^2$) can be found from the depth of mercury if the electrolytic cell of the present invention is connected to a photocell and calibrated with a separate known apparatus such as a standard lamp of known radiation energy.

The manner of filling the vertical hole in the carbon cathode with mercury will now be described. In the preferred manner, the platinum wire 15 is first simply inserted into the empty hole 17 and hangs freely therein, so the electrical contact between the platinum wire and the carbon cathode is poor. When the electrolyte is poured after the electrolytic cell has been assembled, the holes 17 and 17' are filled with the electrolyte, and the platinum wire is electrically connected to the carbon cathode via the electrolyte. A d-c current is then supplied across the cell and electrolysis takes place in the electrolyte in the vertical hole between the platinum wire and the carbon electrode, whereby mercury precipitates and builds up in the vertical hole 17, so that the platinum wire is eventually electrically connected to the carbon cathode via mercury. If this operation is performed once when the electrolytic cell is produced, during the subsequent use mercury precipitates only on the surface of the carbon cathode, but does not precipitate only on the surface of the carbon cathode, but does not precipitate on the platinum wire. Further, if the diameter of the vertical hole is made sufficiently small, mercury does not spill from the vertical hole even when the cell is turned upside down to empty the mercury reservoir 19. The requirement for connecting the platinum wire to the carbon cathode of the present invention is thus fulfilled. This requirement can also be achieved by filling the vertical hole 17 with mercury and then inserting the platinum wire. The preferred method, however, is simpler.

The level of the electrolyte 21 in the cell should be such that the upper end of the carbon cathode 16 is barely immersed therein, so that no mercury precipitates on the platinum wire.

The operation and effects of the electrolytic cell of the present invention will now be described. Measurements were taken using a carbon arc lamp (discharging at 135 volts, 16 amperes) of a light-fastness/weather-resistance tester. When light was received using a silicon photocell for 10 hours, mercury built up to a depth of 15 mm. When the light was received for 20 hours, mercury built up to a depth of 30 mm. The above two values, which are completely proportional, verify that mercury falls from the carbon electrode in the form of fine particles immediately after it precipitates, and that a carbon electrode in the form of a flat plate increases the amount of mercury precipitation during the initial stages of operation without introducing any problems. In the conventional cell, mercury does not fall during the initial stage of electrolysis, and the precision of measurement precision is poor during this stage of operation. With the electrolytic cell of the present invention, however, the above-mentioned drawback is overcome.

If it is assumed that the precision with which the depth of the mercury can be read by eye is ±0.2 mm, the measurement of light for 20 hours is accurate to within 0.2÷30×100=0.7%.

What is claimed is:

1. An electrolytic cell for an actinometer comprising:
a glass vessel having a glass filter extending across the central portion thereof and constituting a separator wall dividing the vessel into two side by side chambers;
a body of mercury in the bottom of one chamber and a platinum wire extending into said one chamber and into said body of mercury for forming an anode for said cell;
a carbon plate mounted in the other chamber and having a space defined between said plate and said separator wall and having a hole extending thereinto from the top, mercury substantially filling said hole, and a further platinum wire extending into said mercury in said hole for forming a cathode for said cell, said wires extending through and being sealed to the glass of said vessel;
a glass tube extending downwardly from said other chamber for collecting precipitated mercury therein during operation of said cell; and
an electrolyte filling said tube and said chambers and extending to a level just above the upper end of said carbon plate.

2. An electrolytic cell as claimed in claim 1 in which said carbon plate further has a lateral hole therethrough extending through said firstmentioned hole.

3. An electrolytic cell as claimed in claim 1 in which said carbon plate has a lateral projection at the top thereof, and said carbon plate is secured to said separator wall with the free end of said projection and the lower end of said carbon plate against said separator wall, the lower end of said carbon plate having a cut-out therethrough opening into the space defined between said carbon plate and said separator wall.

* * * * *